July 9, 1940.  R. S. SMITH  2,207,273
COUNTER MECHANISM
Filed Aug. 24, 1936  6 Sheets-Sheet 1

Inventor
Reuben Stanley Smith.

Attorney.

July 9, 1940.  R. S. SMITH  2,207,273
COUNTER MECHANISM
Filed Aug. 24, 1936    6 Sheets-Sheet 3

Inventor
Reuben Stanley Smith
Attorney.

July 9, 1940.                R. S. SMITH                2,207,273
                          COUNTER MECHANISM
                        Filed Aug. 24, 1936           6 Sheets-Sheet 4

July 9, 1940.    R. S. SMITH    2,207,273
COUNTER MECHANISM
Filed Aug. 24, 1936    6 Sheets-Sheet 5

Inventor
Reuben Stanley Smith.
Attorney.

July 9, 1940.　　　　R. S. SMITH　　　　2,207,273
COUNTER MECHANISM
Filed Aug. 24, 1936　　　　6 Sheets-Sheet 6

Inventor
Reuben Stanley Smith.

Attorney.

Patented July 9, 1940

2,207,273

UNITED STATES PATENT OFFICE 2,207,273

COUNTER MECHANISM

Reuben Stanley Smith, Los Angeles, Calif., assignor to Smith Meter Company, a corporation of California Application August 24, 1936, Serial No. 97,567

17 Claims. (Cl. 235—144)

This invention relates generally to counter mechanisms and is more particularly concerned with mechanisms well adapted for use in connection with fluid flow meters, though not limited thereto.

The mechanism as here shown, includes a continuous or totalizer unit, a set-back or "trip" unit (which allows for resetting to zero after each "trip" or individual delivery of fluid by the meter) and a fraction counter, sometimes known as an accuracy wheel or counter which indicates deliveries of fractional parts of the unit measure.

Some of the features and objects of the present invention have to do with the novel association of the several units and the cooperation therebetween, while others have to do with the individual units, whether or not they are associated with the other units.

Among the objects of the invention are to provide a compact mechanism occupying a minimum of space, a mechanism which will give accurate measurement registrations and maintain a high degree of accuracy for a long period of continual use, and a mechanism which is, within reasonable limits, incapable of being tampered with to give wilfully intended inaccurate results.

The invention also includes a novel clearing or set-back mechanism for the trip counter, whereby the set-back operation is accomplished surely, accurately and completely, but with ease and dispatch, assurance being given that a single operation of the mechanism will entirely clear the counter and line up the counter wheels accurately and in proper condition for the subsequent counting operation. Provision is made whereby the resetting mechanism can not be forced to over-run, that is it cannot be forced to pass the wheels beyond the zero position once they are lined up in that position. The reset knob is automatically returned to idle or inoperative position upon completion of the clearing or reset operation.

As a special feature, the operation of a single knob accomplishes the set-back or clearing of both the trip counter and the fraction counter, thus not only simplifying the clearing operation but also insuring that both units are completely cleared, it being impossible to clear one without the other, and, as distinguished from other counters having independent clearing devices, wherein it is possible for the operator to clear one but forget to clear the other.

Other objects and novel features of the invention will become apparent from the following detail description, reference being had to the accompanying drawings, in which.

The counter mechanism here illustrated is particularly well adapted for use in connection with fluid-flow metering devices, and has been used to very great advantage in connection with meters in gasoline flow lines. Accordingly, the unit of the measure indicated on the counter is taken as a gallon, there being three individual counter units, one measuring tenths of gallons, the second measuring, in gallons, individual or "trip" deliveries and therefore being resettable to zero after each individual delivery, and the third a gallon totalizer. However, it will be readily understood that the counter is adapted for use in connection with any measuring device or prime-mover capable of applying rotary movement to the drive shaft of the counter, and that the units of measure may be other than those here indicated. Accordingly, the following detailed description of a particular embodiment of the invention is to be considered merely as illustrative of and not limitative on the invention.

The numeral 10 indicates a casting or the like which serves both as a housing for the counter mechanism, generally indicated at 11, and as a top cover for a fluid flow mechanism (not shown) which is adapted to be operatively connected to this counter. Casting 10 is circular, as viewed in plan, the housing portion 12 extending diametrically across the casting and being substantially rectangular, as viewed in plan. The flange portion 13 of the casting is adapted to fit a fluid flow mechanism, or the like, (not shown). Housing portion 12 has a rear wall 14, a shorter forward wall 15, end walls 16 (Fig. 3), and a top wall 17 which has an inclined portion 18 provided with a sight opening 19, below which is positioned glass 20.

Figure 9:
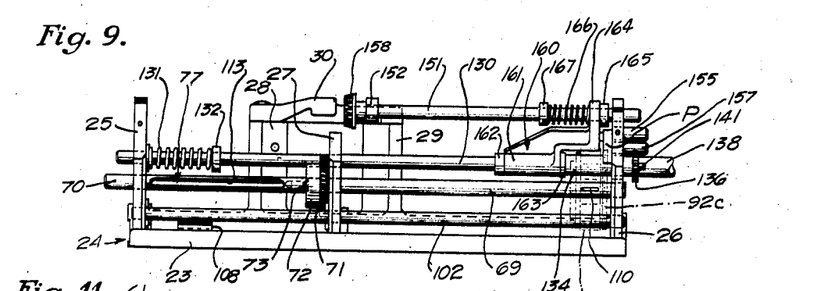
Fig. 9 is a detail elevation of the frame and shaft assembly, most of the counter wheels and gears being stripped therefrom.
Figure 10:
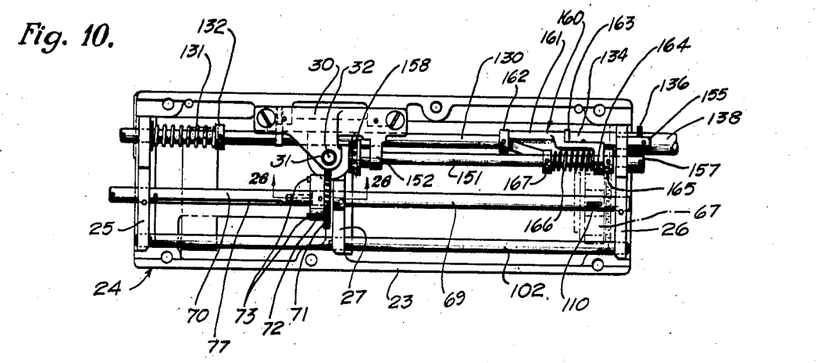
Fig. 10 is a top plan view of Fig. 9.

Extending inwardly from walls 14 and 15 are bosses 21, to the under face of which are secured, as by screws 22, the base plate 23 of the frame of counter 11, said frame being indicated generally at 24 (Figs. 9 and 10). Frame 24 has integral end plates or walls 25 and 26 and a shorter, intermediate upright wall 27. From the rearward edge of base plate 23 rise two posts 28 and 29 which are bridged by cross-bar 30 (Fig. 9) this bar carrying bearing 31 for drive shaft 32.

Figure 27:
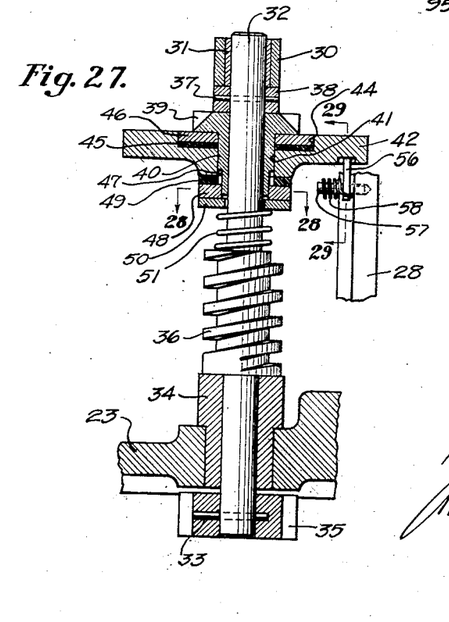
Fig. 27 is a fragmentary showing, on an enlarged scale, of the accuracy-wheel and its drive in the same aspect as that of Fig. 6.

As illustrated in Fig. 27, vertical drive shaft 32 has bearing near its lower end in a bearing thimble 34 which has press-fit in base plate 23. Pinned at 33 to shaft 32 below plate 23 is a drive pinion 35 whereby rotation of, for instance, the rotor of a fluid flow meter (not shown) is transmitted to shaft 32, the counter being geared and calibrated in such a manner that the extent of angular movement of shaft 32 has a known ratio to the output of the meter, this ratio being such that, in the illustrated embodiment of the invention, one revolution of shaft 32 will indicate the delivery of one gallon of fluid through the meter.

Figure 28:
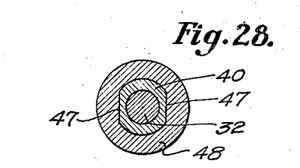
Fig. 28 is a section on line 28—28 of Fig. 27.

Integral with shaft 32 and having end bearing on top of member 34, is a worm 36, the office of which will shortly be described. Pinned at 37 to shaft 32 and lying immediately below bearing 31, is a drive collar 38, which overlies and frictionally engages bevel gear 39 having a hub portion 40 which extends through bore 41 in indicator wheel 42, this wheel being marked both on its top face and peripheral edge to show tenths of gallons, as indicated at 43. This "fraction" or "accuracy" wheel 42 is counter-bored at 44 to take a fiber friction washer 45 and a metal washer 46, the latter lying immediately beneath bevel gear 39. Hub 40 extends below wheel 42, the extension being flattened as at 47 (Fig. 28) to take washer 48, the bore of this washer being likewise flattened to fit the hub flats. The hub and washer are thus held against relative rotation.

Between washer 48 and wheel 42 is a fiber friction washer 49, the bore of this washer being circular. Washer 48 extends downwardly to a point below the lower end of hub 40, a thrust washer 50 underlying washer 48 and taking the thrust of spring 51 which rests on top of worm 36. Spring 51 thus tends to compress the friction drive assembly made up of collar 38, gear 39, wheel 42 and washers 45, 46, 48 and 49 toward the stationary bar 30, the upper end of gear 39 being thus pressurally engaged with the underside of drive collar 38, so, as the latter is driven by shaft 32, gear 39 and the washer 48 keyed thereto will be driven, which drive is transmitted through friction washers 45 and 49 to indicator wheel 42. The assembly thus provides for the rotation (in a clockwise direction as viewed in Fig. 3) of indicator wheel 42. On the other hand, it will be seen that the friction-drive assembly also will permit rotation of indicator wheel 42 with respect to shaft 32, in the event said shaft is held stationary, by rotating bevel gear 39 about the shaft. The occasion for imparting this type of drive, which has to do with the resetting or clearing of the counter, will be discussed later.

Figure 11:
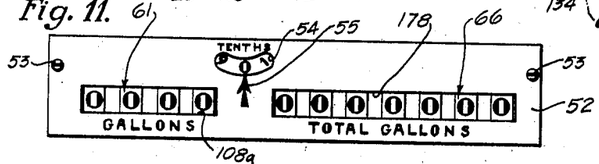
Fig. 11 is an elevation of the indicator face plate and counter wheels lying therebeneath, as viewed from line 11—11 of Fig. 6.
Figure 29:
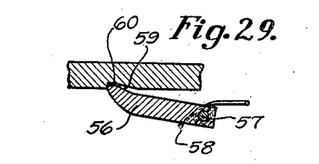
Fig. 29 is a fragmentary section on line 29—29 of Fig. 27.

Indicator face plate 52 (Fig. 11) extends from end wall to end wall of frame 24, being secured to said walls by screws 53. The face plate has a sight opening 54, which is viewable through cover-glass 20, whereby at least one of the numbers on indicator wheel 42 may be viewed, arrow 55 indicating the normal position of the zero-marking on the indicator wheel. When the wheel is in zero position, pawl 56 (Figs. 4, 27 and 29) which is pivotally mounted on post 28 at 57, is held by spring 58 in notch 59 provided in the underside of wheel 42. The pawl engages the square-cut shoulder 60 at the end of the notch to prevent counterclockwise movement of the indicator wheel. Thus, in the event shaft 32 be rotated reversely (it being understood that the normal direction of rotation of said shaft is clockwise, as viewed in Fig. 3) wheel 42, if it be in the zero position, will be held stationary while the shaft rotates idly, the friction drive heretofore described allowing the necessary slippage, and the effective pressures being such that usually the bevel gear 39 will remain stationary along with wheel 42, and collar 38 will slip over the top of the bevel gear. Of course, if indicator wheel 42 is set at any point other than zero when the reverse rotation of the shaft is initiated, the wheel will likewise rotate in a counterclockwise direction until the zero is opposite arrow 55, whereupon pawl 56 engages shoulder 60 to prevent further wheel-rotation, and the slippage described above will occur.

Pawl 56 will act in the same manner during the clearing or resetting of the counter. With shaft 32 stationary, counterclockwise movement of wheel 42 is then purposely set up through rotation of gear 39 by a manually operated drive gear, in which case, as soon as wheel 42 reaches zero position pawl 56 is projected into notch 59 and further rotation of gear 39 is ineffective further to shift the indicator wheel, the friction drive previously described allowing gear 39 to rotate idly with respect both to shaft 32 and wheel 42.

The trip or "set-back" counter unit is indicated generally at 61, and includes four individual counter wheels 62, 63, 64 and 65, while the totalizer or "continuous" counter unit is generally indicated at 66 and includes one drive counter wheel 67 and six standard counter wheels 68. It will be appreciated, however, that the capacity of the mechanism is not limited to any specific number of wheels on either counter unit.

Figures 24, 25, 26:
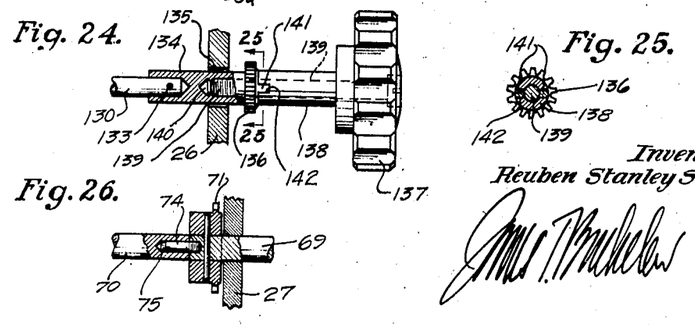
Fig. 24 is an enlarged fragmentary detail, partly in section and partly in elevation, showing the connection of the reset knob with the reset shaft.
Fig. 25 is a section on line 25—25 of Fig. 24.
Fig. 26 is an enlarged section on line 26—26 of Fig. 10.

Totalizer shaft 69 and trip or set-back shaft 70 are supported in axial alignment, but are capable of independent or relative rotation. Totalizer shaft 69 has bearing in end plate 26 and intermediate plate 27, and pinned to this shaft is worm wheel 71 which meshes constantly with worm 36, the worm wheel having a hub portion 72 which carries two diametrically opposite drive pins 73 extending parallel to the shaft (Fig. 10). Screwed in the end of shaft 69 is a projecting pin 74 (Fig. 26) which is taken within a socket 75 in the end of trip shaft 70, pin 74 thus providing support and bearing for the inner end of shaft 70, the outer thereof having bearing in end plate 25. Collar 76 (Fig. 3) is pinned to shaft 70 adjacent wall 25, this collar and gear 71 engaging opposed frame walls to prevent endwise movement, in either direction, of both shafts 69 and 70.

I will first describe the mounting of the counter wheels on trip shaft 70, which shaft is provided with a relatively wide key-way 77 (Fig. 9). During normal operation of the counter, shaft 70 is held against rotation with key-way 77 in a definite position, the wheels rotating idly about the shaft. As will appear, during the clearing or resetting operation, shaft 70 is manually rotated, but for the time being this rotating means as well as the means normally holding the shaft against rotation may be disregarded, as they play no part in the counting operation.

The counter wheel 62 of the trip counter may be considered as the drive wheel of this unit, as it is this wheel which imparts the drive from worm gear 71 (and thus from shaft 32 which, in turn, transmits the drive from the prime mover) to the remaining trip counter wheels. Referring particularly to Figs. 14 to 18, inclusive, wheel 62 is made up of a sleeve 78 which is mounted for rotation on shaft 70, and tightly clamped by rivets 79 to flange 80 of this sleeve are cup-shaped members 81 and 82, pinion-locking-ring 83 and transfer disk 84. Transfer disk 84 has the usual tooth-pair 85 extending radially to the peripheral face 86 of ring 83, while ring 83 has usual notch 87 registered with the tooth-pair. Flange 88 of cup member 81 (the outer periphery of which carries the usual numerical indicia 89) is tightly fitted about flange 90 of member 82, and the inner peripheral face of flange 90 holds ratchet ring 91 having relatively fine, internal ratchet teeth. Journalled on sleeve 78 is gear 92 which carries pawls 93 adapted to be pressed by spring 93' into engagement with ratchet teeth 91. The gear is also provided with two sockets 94 to take drive pins 73 of worm wheel 71. The ratchet pawls are so arranged that counterclockwise movement of gear 92 (as viewed in Fig. 18) will drive cup members 81 and 82 and all parts carried thereby in a counterclockwise direction as viewed in Fig. 16 or in a clockwise direction as viewed in Figs. 15 and 8, while, with gear 92 held against rotation, as it is during the resetting of the counter, members 81 and 82 and all parts carried thereby may ratchet in that same direction.

Figure 15:
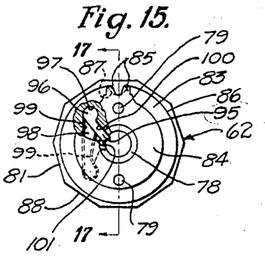
Fig. 15 is a side elevation of Fig. 14, as viewed from the left thereof, but showing the pawl-mounting in broken-away section.
Figure 16:
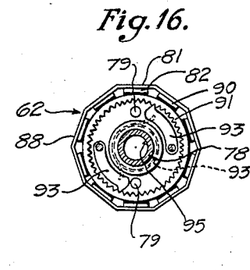
Fig. 16 is a section on line 16—16 of Fig. 14.
Figure 17:
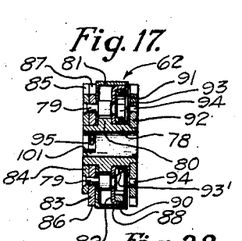
Fig. 17 is a section on line 17—17 of Fig. 15.
Figure 18:
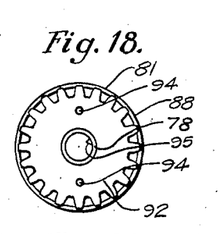
Fig. 18 is an elevation of Fig. 14, as viewed from the right thereof.

Though this has nothing to do with the drive of the counter wheels in the counting or adding operation, I will here briefly describe the resetting or clearing pawl 95 shown in Fig. 15. This pawl has an arcuate head 96 which has bearing in a complementary recess 97 sunk in ring 83. This recess is extended as at 98 to take spring 99 which tends yieldingly to hold pawl 95 in the position of Fig. 15, the shoulder 100 which defines one wall of the recess extension forming an abutment which limits the counterclockwise movement of the pawl, as viewed in the figure. With wheel 62 set at zero position, the end of pawl 95 extends through notch 101 in sleeve 78 and projects through the bore of the sleeve into key-way 77. As gear 92 drives the associated counter wheel in a clockwise direction, as viewed in Fig. 15 (and remembering that we are now considering shaft 70 as held against rotation) spring 99 will yield to allow the pawl to be drawn out of the key-way, it following that the counter wheel may be revolved in this direction through any number of revolutions without interference from pawl 95, the pawl merely clicking in and out of the key-way once during each shaft revolution.

Figures 19, 21:
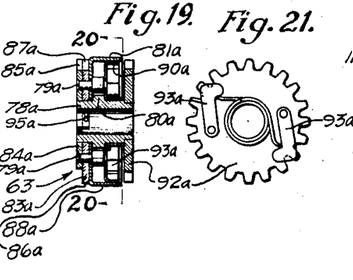
Fig. 19 is a medial section through one of the typical counter-wheels of the trip counter, the sectional plane lying on line 19—19 of Fig. 20.
Fig. 21 is a detached elevation of the gear and pawl assembly shown in Fig. 19, but viewed from the innermost side.
Figure 20:
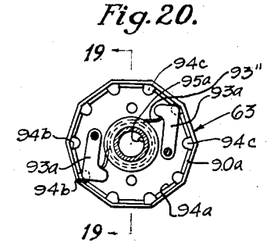
Fig. 20 is a section on line 20—20 of Fig. 19.

Counter wheels 63, 64 and 65 are alike and therefore only one of them is illustrated in detail, this showing being made in Figs. 19, 20 and 21. In these wheels, members 78a, 79a, 80a, 81a, 83a, 84a, 85a, 87a and 88a are similar, respectively, to those parts previously described and carrying the same base numbers. In this case, however, gear 92a is not provided with drive sockets 94, while the spring-pressed pawls 93a engage the relatively coarse ratchet 94a in member 82a, which ratchet is made up of relatively widely spaced shoulders 94b provided by notching flange 90a as at 94c. There is here shown one effective shoulder 94b for each numeral on the wheel. The wheels carry reset pawls 95c which are fashioned and mounted precisely like pawls 95.

Pawls 93a and ratchet shoulders 94b are so arranged that when gear 92a (as viewed from the right of Fig. 19) is rotated in a counterclockwise direction, number wheel 63 is similarly rotated to advance the numerals on the wheel in proper order. On the other hand, when, during the clearing operation, number wheel 63 is rotated in the same direction by the manually operated clearing means, gear 92a may remain stationary while the pawls click over the ratchet shoulders.

Figure 6:
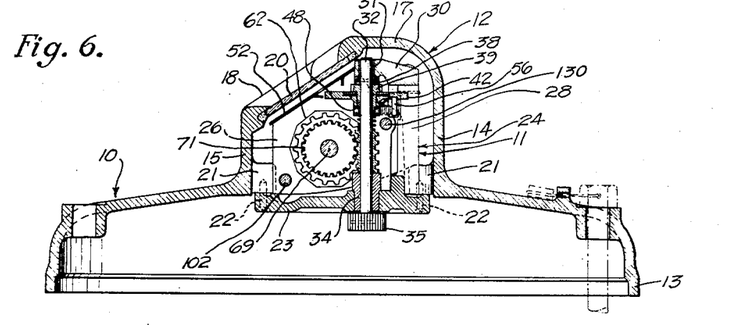
Fig. 6 is a section on line 6—6 of Fig. 3.

Extending through the end and intermediate walls 25, 26 and 27 of frame 24, is a pinion shaft 102 (Figs. 4, 6 and 10) upon which are mounted for individual rotation, usual transfer pinions 103, 104 and 105. These pinions are of the usual type, that is, every other tooth 106 is of approximately half width, while the alternate teeth 107 are of full width. Except when the counter wheels are around "9" and "0" positions, two adjacent full width teeth 107 of each pinion are adapted to overlie the peripheral face 86 or 86a of the lock ring 83 or 83a to the right thereof, and the half tooth 106 between those two full width teeth will mesh with the gear 92a lying at the left thereof, pinion rotation and hence rotation of the associated gear 92 being prevented by the presence of shoulder 86 or 86a beneath the full-width teeth. The half width teeth, however, are sufficiently wide to extend into the path of tooth-pair 85.

As shaft 32 and hence worm 36 are rotated in a clockwise direction (as viewed in Fig. 3) worm wheel 71 drives gear 92 in a counterclockwise direction (as viewed in Fig. 18) through pins 73, pawls 93 imparting like rotation to wheel 62 and thus successively moving the numerals 89 into view through opening 108a in face plate 52 (Fig. 11) where they may be viewed through housing-glass 20. As the wheel passes from the position where digit 9 appears, towards zero position, the leading tooth of tooth-pair 85 engages the particular half-tooth 106 which has been in mesh with gear 92a, and advances the pinion, notch 87 in ring 83 accommodating the full width tooth 107 which then is taken between the teeth of pair 85, whereupon the following tooth of the tooth-pair acts against that full-width tooth, further to rotate the pinion. This rotation of the pinion rotates gear 92a which, through pawls 93a, rotates wheel 63 in the same direction as wheel 62. The extent of rotation thus imparted to wheel 63 by the time tooth-pair 85 has cleared the pinion and a following full width tooth 107 has engaged peripheral face 86 to check further rotation of gear 92a, is just sufficient to bring the numeral 1 on wheel 63 into full view, the zero on wheel 62 coming simultaneously into full view. Thus, for each full revolution of wheel 62, a one-tenth of a full revolution is imparted to wheel 63. In a similar manner, as wheel 63 completes its last one-tenth of a full revolution, transfer pinion 104 rotates wheel 64 one-tenth of a full revolution. Pinion 105 acts similarly between wheels 64 and 65. It will be evident that continued operation of gear 92 will act through the selective drive connections just described, to advance the counter wheels so the total indicated thereby will represent the total number of revolutions imparted to shaft 32 and hence the total gallons delivered on a given "trip" or delivery.

Figure 5:
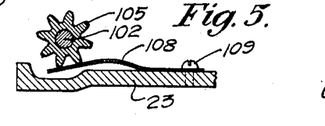
Fig. 5 is a fragmentary detail section taken on line 5—5 of Fig. 4, but showing only the details of a pinion brake.

As lost motion between the pinions and gears accumulates from right to left of unit 61, wheel 65 is apt to have considerable play and bring about mis-location of that wheel during subsequent operations, particularly since, during the clearing operation, the drive of the wheels is not through the pinions and gears. In order to overcome this difficulty, a bowed leaf spring 108 is fastened to base plate 23 at 109 and engages pinion 105 (Fig. 5) in a manner yieldably to hold that pinion stationarily in positions to which it has been moved by the transfer disk on wheel 64, so the play of wheel 65 is reduced to the extent of play between its gear 92a and pinion 105.

In the event drive pinion 35 is wilfully or accidentally rotated in a reverse direction (that is, in a counterclockwise direction as viewed in Fig. 3) gear 92 is driven in a clockwise direction (as viewed in Fig. 18) and the tension of spring 93' is usually such that it presses pawls 93 against the teeth of ratchet 91 with sufficient force to tend to transmit like movement to wheel 62; but pawls 93 will start to click over ratchet 91 as soon as wheel 62 has been reversely rotated sufficiently to engage pawl 95 with shoulder 113 of key-way 77, which positively checks further reverse rotation of the wheel, it following that continued reverse rotation of pinion 35 will have no further action on the counter indication.

Figure 7:
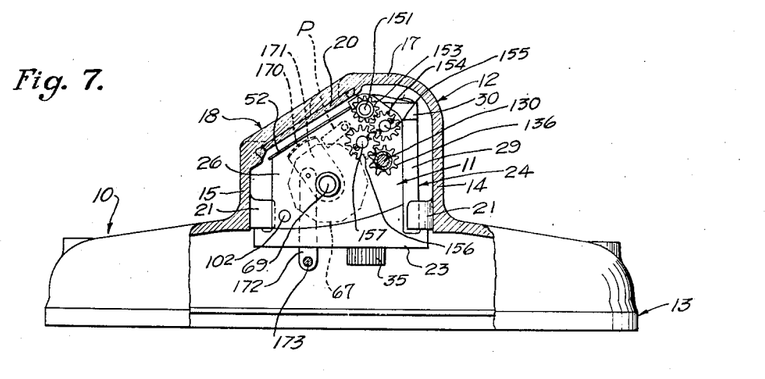
Fig. 7 is a section on line 7—7 of Fig. 3.
Figure 22:
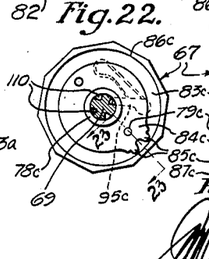
Fig. 22 is an enlarged section on line 22—22 of Fig. 4, showing only the drive shaft and the drive counter wheel of the totalizer unit.
Figure 23:
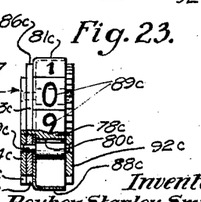
Fig. 23 is a side elevation of Fig. 22, but showing parts in broken-away section on line 23—23 of Fig. 22.

Now referring to totalizer unit 66, it will be noted that shaft 69, to which worm wheel 71 is positively keyed, carries a plurality of key-ways 110 (Figs. 9 and 22) spaced angularly thereabout and associated with the first or drive wheel 67. This drive wheel is made up of sleeve 78c, to the flange 80c of which are rigidly clamped (by rivets 79c) cup member 81c (having numerals 89c on the exterior peripheral face of its flange 88c) gear 92c, pinion locking ring 83c, and transfer disk 84c, the latter having tooth-pair 85c and the locking ring having a registering notch 87c; the construction of the locking ring and transfer disk being the same as that described in connection with Figs. 15 and 17. A spring-pressed driving pawl 95c is mounted in ring 83c in a manner similar to that described in connection with Fig. 15, the nose of this pawl being adapted to engage any one of the key-ways 110. This pawl is arranged so that, as shaft 69 is rotated in a clockwise direction (as viewed in Fig. 22) rotary drive is transmitted through the pawl to wheel 67 to advance the numbers on said wheel from zero toward 9. If the shaft be rotated in a reverse direction, ratchet 95c will merely click in and out of key-way 110 without imparting reverse rotation to the wheel, though preferably there is provided a gravity pawl P (Figs. 7 and 9) pivotally mountd on wall 26 and engaging the teeth of gear 92c in a manner positively to prevent such reverse rotation of wheel 67, it being remembered that in this case the gear and wheel, proper, are rigidly pinned together.

All the remaining wheels 68 on shaft 69 are similar to wheel 67 except they have no pawl corresponding to 95c, the wheels being mounted for free rotation upon the shaft, except as controlled by the transfer pinions. These transfer pinions are indicated at 112 on shaft 102 and function to transfer the last tenth of a revolution of each wheel to the wheel immediately to the left in the same manner as that described in connection with trip counter unit 61. It will be understood that the worm 36 is of such ratio to worm wheel 71 that one revolution of shaft 32 imparts a tenth of a revolution to shaft 69 and (through drive pins 73) to gear 92, it following that each revolution of shaft 32 indicates one gallon advance on the trip counter and totalizer units.

The clearing or resetting of the trip counter 61 is accomplished by a novel mechanism. Generally, it is accomplished by advancing all the trip counter wheels to a zero position by rotating shaft 70 in a clockwise direction (as viewed in Fig. 8) such rotation being imparted to the wheels through pawls 95 and 95a, instead of through gears 92 and 92a, as is true during normal counting operation of the mechanism, though it will be noted the direction of clearing movement of the wheels is the same as the direction of counting movement. As a result, all wheels which stand at zero just prior to the clearing operation must be rotated through 360° to represent the zero in the cleared counter.

Reset shaft 70 has a reset or drive shoulder 113 (Figs. 9 and 34 to 37) whereby the trip counter is cleared or reset to zero position. This shoulder is here shown as one defining wall of key-way 77, but it will be understood this showing is not to be considered as limitative on the character and formation of the shoulder. Rotation of shaft 70 in a clockwise direction (Figs.

8 and 34 to 37) eventually drivingly engages shoulder 113 with all pawls 95 or 95a (which pawls may be considered as drive shoulders on the counter wheels) irrespective of the positions to which the various wheels have been rotated during the counting operation, picking up the wheels in order (that is, first the wheels which are at zero, then those at 1, then those at 2, etc.) and rotating them in a manner to bring them back to zero, whereupon further shaft-rotation is prevented by means to be described.

During this clearing rotation of the wheels, the ratchet connections between the wheels and their respective gears allow said gears to remain stationary, except that as all wheels pass from the 9 position to the zero position in the final one tenth of a revolution, the transfer pinions and the gears on wheels 63, 64 and 65 will be rotated due to the fact that the teeth on the transfer disks are then effectively engaged with the transfer pinions.

Since one or more of the wheels will probably be at zero when the resetting or clearing operation is undertaken, and those wheels will be the first to be picked up by shoulder 113, the reset mechanism must be such that it is capable of rotating these wheels through a full 360° in order that they may be returned to zero. In order to point out an important feature in the reset mechanism which is concerned with this necessity for immediately picking up the zero wheels, it is necessary to set forth what would happen were it not for the inclusion of this feature.

Assume that all trip wheels are set at zero and that shoulder 113 were in engagement with pawls 95 and 95a of all the wheels. Now assume that the counter be driven forwardly by normal operation of shaft 32 until the trip counter read 0109 but that wheel 63, through some slight inaccuracy, excessive wear of parts, or any other cause, has not been advanced quite 360°, with the result that its pawl 95a has not dropped in front of shoulder 113. Then, during the rest operation, clockwise rotation (Fig. 8) of the reset shaft would not immediately pick up wheel 63, as it does all other wheels set at zero. Instead, wheel 63 would remain stationary while the rest of the wheels have been rotated until the counter reads 9909. Then, upon continued rotation of shaft 70, the teeth of the transfer disks 84 and 84a on all wheels except 63 would engage the associated transfer pinions, causing rotation thereof as the wheels pass to zero. During this movement, transfer pinion 103, driven by the transfer disk 84 on wheel 62 would engage gear 92a on wheels 63, advancing that wheel 63 from zero to 1. Consequently, the counter, instead of being cleared, would read 0010, and it would become necessary to rotate shaft 70 through another complete revolution to clear the counter. This assumed condition is one which actually happens in the operation of certain types of counters.

Generally, this condition is avoided in the present arrangement by definitely assuring that as each wheel is advanced to zero position during normal counter operation, the pawl 95 or 95a of that wheel will definitely be in front of reset shoulder 113 so as surely to be picked up during the reset operation ahead of all wheels which present any number from 1 to 9. This assurance is gained by means which automatically backs the reset shoulder away from the pawls immediately after the counter is entirely cleared, it following that upon a normal re-run of the counter, the pawls may drop over the shoulder somewhat before the associated wheels reach zero position and thus assuredly be ahead of that shoulder (rather than there being any possibility of being behind it) when the wheels finally reach zero position.

How this is accomplished will be described in connection with the following discussion of the reset mechanism. The resetting of the trip counter and of the accuracy wheel is accomplished simultaneously and with the actuation of a single reset knob, but the resetting of the accuracy wheel will be taken up separately and at a later point.

Figure 12:
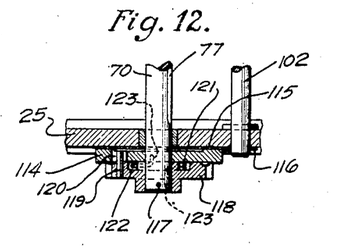
Fig. 12 is an enlarged section on line 12—12 of Fig. 8.
Figure 30:
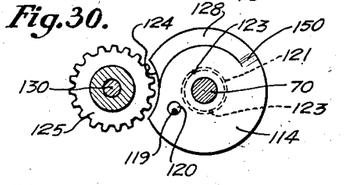
Fig. 30 is a section on line 30—30 of Fig. 13.

Mounted for rotation on shaft 70 at the outer face of frame end 25, is a control disk 114 (Figs. 3, 4, 8, 12, 13 and 30 to 32, inclusive), a thin bronze washer 115 preferably being interposed between wall 25 and the control disk and having an extension 116 (Figs. 8 and 12) which is pierced to receive shaft 102, the washer thus being held from bodily rotation about shaft 102. Pinned at 117 to shaft 70 and in facial engagement with control disk 114 is gear 118. Drive pin 119 carried by gear 118 is entered in an enlarged or lost motion socket 120 in control disk 114 (Figs. 12 and 30). Torsion spring 121 is disposed in a recess 122 sunk in gear 118, and the opposite ends 123 of this spring are applied to disk 114 and gear 118 in a manner tending to rotate gear 118 in a counterclockwise direction (as viewed in Fig. 8), maintaining pin 119 at the bottom of socket 120, as illustrated in Fig. 30.

Figure 13:
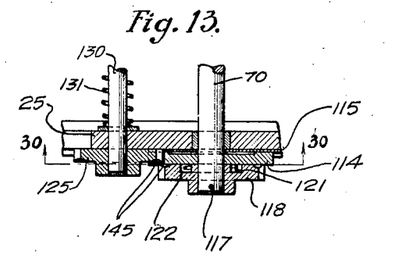
Fig. 13 is an enlarged section on line 13—13 of Fig. 8.
Figure 14:
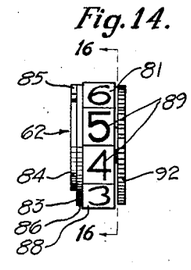
Fig. 14 is an elevation of the drive counter-wheel of the trip counter unit.
Figure 31:
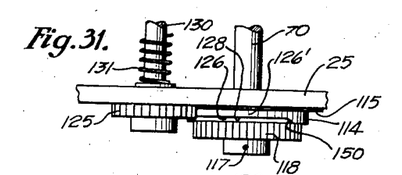
Fig. 31 is a top plan view of Fig. 30.

An arcuate recess 124 is cut in the peripheral face of disk 114 of a size and shape to take, with slight clearance, part of gear 125 under certain circumstances. With gear 125 occupying this position, washer 115 and control disk 114 are of a thickness to hold gear 118 beyond the plane of gear 125 (as shown in Figs. 13 and 31), so said gear 125 may be revolved without in any way affecting gear 118. At one side of recess 124 the outer side face of control disk 114 is cut down as at 126, the resulting thinner portion 126' extending arcuately about the control disk through about 90°, though this particular degree of extent is not controlling. Since the control disk at the other side of recess 124 is of full thickness, that portion of the recess-defining wall which is opposite the thinner portion 126' extends above face 128 of said thinner portion to form a stop shoulder 129 (Fig. 33), the purpose of which will be described later.

Gear 125 is pinned to reset shaft 130, the latter having bearing in end wall 25 and extending across the rear of the counter. This shaft is not only rotatable but also has a capacity for limited endwise movement, spring 131 being interposed between end wall 25 and a collar 132 pinned to the shaft and tending always to hold said shaft yieldingly to the right, as viewed in Figs. 9 and 10. Pinned to the opposite end of shaft 130 at 133 is a sleeve 134 which extends through a clearance hole 135 in end wall 26, the outer end of this sleeve carrying an integral pinion 136 (Figs. 7, 24 and 25) Resetting knob 137 has an elongated hub portion 138 through which extends screw 139, the latter being threaded into bore 140 in sleeve 134. Tongues 141 on sleeve 134 project into complementary sockets 142 provided in the end of knob-hub 138, the knob and sleeve 134 thus being keyed against relative rotation. Sleeve 138 extends through bearing lug 138' (Fig. 3) in housing wall 16 to the exterior of the housing, this bearing in the lug providing, in effect, the right hand bearing for reset shaft 130.

Figure 34:
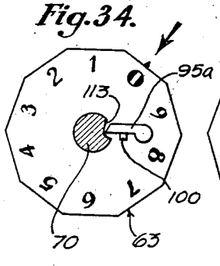
Figs. 34 to 37, inclusive, are schematic views illustrating certain features of the reset assembly.

It will now be assumed that the trip counter is set at zero position, ready to indicate a measure of gasoline delivery. The various parts of the reset assembly will be in the positions indicated in Figs. 12, 13, 31 and 32. Since gear 125 is seated in notch 124, control disk 114 is held from relative rotation in either direction and spring 121 yieldingly holds gear 118 so its pin 119 is at the bottom of socket 120. Since gear 118 is pinned to shaft 70, the just described means of holding gear 118 in a predetermined position establishes the position occupied by the key-way 77 in shaft 70 during normal operation of the counter. This normal position of the key-way is represented in Fig. 34, it being noted that shoulder 113 is spaced rearwardly from pawls 95 and 95a of the trip counter wheels, all said wheels being now at zero.

As the counter wheels are revolved in a clockwise direction (as viewed in Fig. 34 and through the described drive from pinion 35) pawls 95 and 95a drag clear of key-way 77, and if more than one revolution is made by any one wheel, the pawl of that wheel merely ratchets with respect to the key-way 77.

Figure 1:
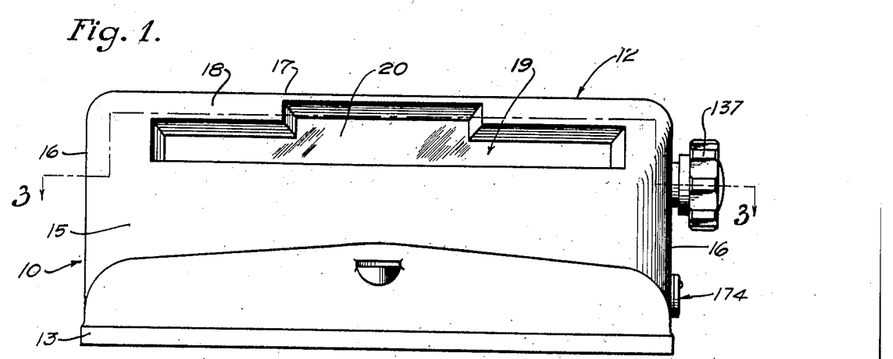
Fig. 1 is a front elevation of the counter housing.
Figure 2:
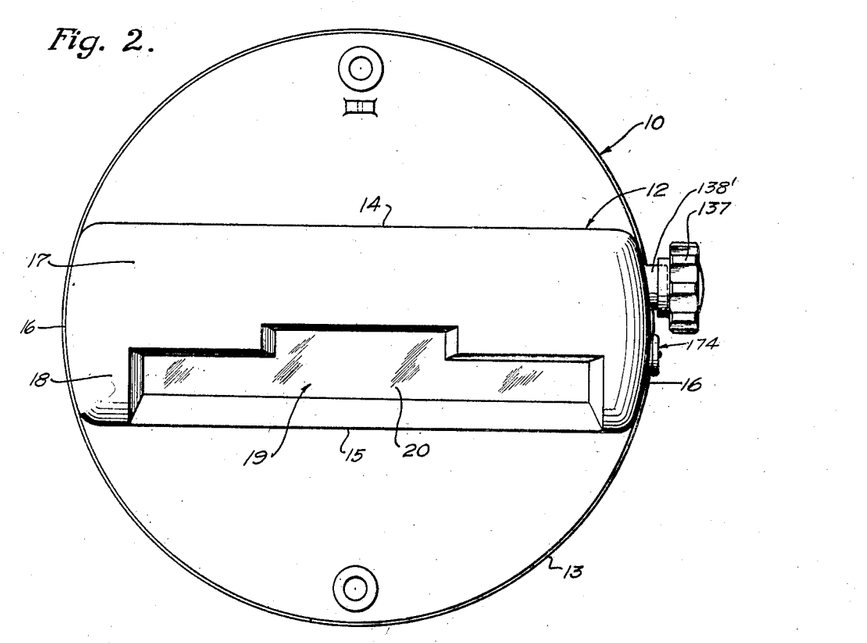
Fig. 2 is a top plan view of Fig. 1.
Figure 3:
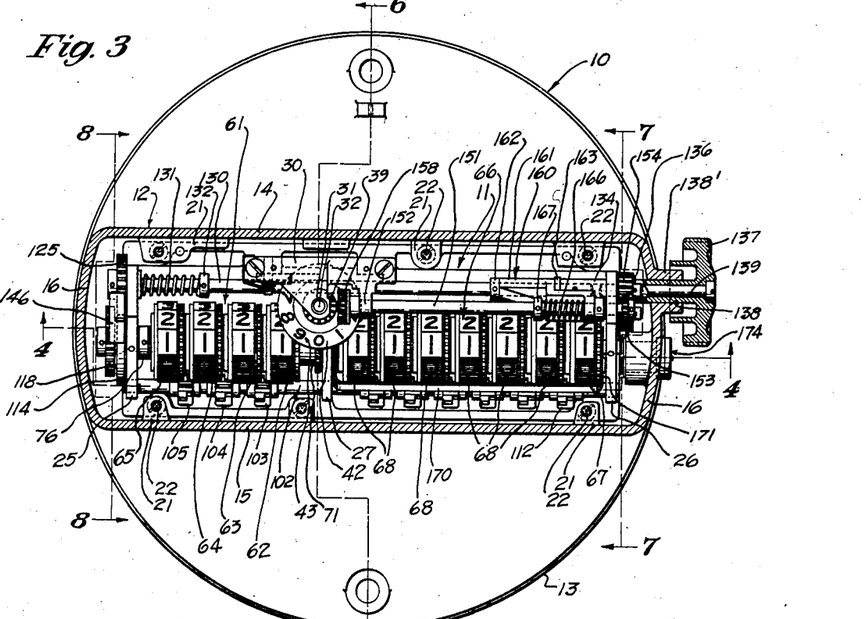
Fig. 3 is a section taken on line 3—3 of Fig. 1 or Fig. 4, the shutter being shown in inoperative position.
Figure 8:
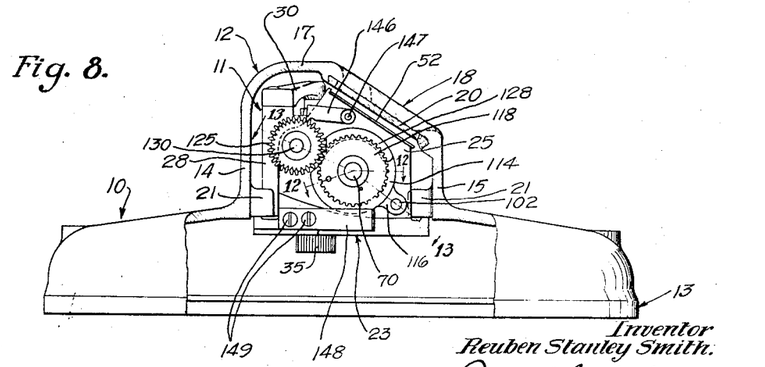
Fig. 8 is a section on line 8—8 of Fig. 3.

When the trip counter is to be cleared, knob 137 is thrust to the left, as viewed in Fig. 3, moving shaft 130 to the left against the resistance of spring 131 until gear 125 is in the plane of gear 118, and the knob is then rotated to turn gear 125 in a counterclockwise direction and gear 118 in a clockwise direction, as viewed in Fig. 8.

Preferably, the teeth on gears 118 and 125 are chamfered at 145 (Fig. 13) to facilitate easy meshing, and a gravity pawl 146 is pivoted at 147 to end wall 25 (Fig. 8) the pawl being adapted to engage the teeth of gear 125 to prevent clockwise rotation thereof.

A leaf brake spring 148 is secured to end wall 25 at 149 and frictionally engages control disk 114 (Fig. 8) to put a friction drag on said control disk so it may not be driven frictionally by its side-face engagement with gear 118. Accordingly, the first bit of angular movement given to gear 118 by rotation of gear 125 is taken up by drive pin 119 passing from the bottom of socket 120 to the top thereof (Fig. 32) and during this take-up of lost motion between the gear and control disk, shaft 70 will have been revolved sufficiently to bring shoulder 113 against the pawl 95 or 95a of any wheel which is in zero position.

Figure 32:
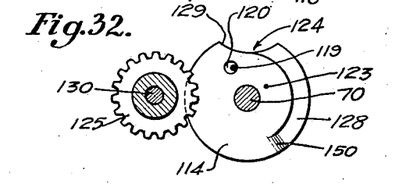
Fig. 32 is a view similar to Fig. 30 but showing the parts in changed relative position.
Figure 33:
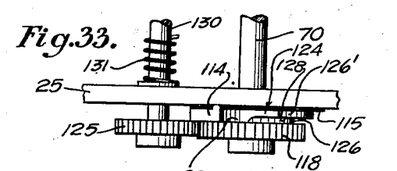
Fig. 33 is a top plan view of Fig. 32.

Continued clockwise rotation of gear 118 then transmits, through drive pin 119, like movement to control disk 114, and the instant an unnotched portion of the control disk is rotated beneath gear 125, inward thrust on knob 137 may be relieved, for said control disk will thereafter hold gear 125 outwardly and in mesh with gear 118 against the action of spring 131 (see Figs. 32 and 33). Thus, the operator merely has to continue rotating reset knob 137 without thought of holding the gears in mesh, and continued clockwise movement of shaft 70 (Fig. 8) will rotate the zero wheels in a clockwise direction and, will, in order, pick up the remaining wheels as shoulder 113 reaches the pawls 95 or 95a thereof.

Figure 35:
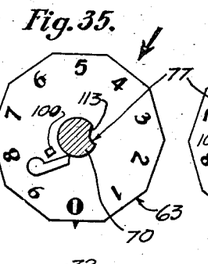

For instance, in Fig. 35, it is indicated that the counter wheel was originally driven to bring numeral 4 into view, which has moved the pawl 95 of that wheel to the position illustrated. Then, when shaft 70 is rotated in a clockwise direction, shoulder 113 will finally reach that pawl 95, as illustrated in Fig. 36, whereupon continued shaft rotation will impart like movement through said pawl and shoulder 100 to the counter wheel.

As rotation of control ring 114 continues, the let-down shoulder 150, which defines the end of the thinner portion 126' of cam disk 114, passes beneath gear 125, allowing that gear to be drawn by spring 131 slightly to the right, as viewed in Fig. 3, though not out of mesh with gear 118. When disk 114 is revolved sufficiently to reach again the position of Fig. 30, spring 131 will snap gear 125 back into recess 124 and thus disengage the gears to prevent further rotation of the control disk and check the clockwise rotation of gear 118.

Since shoulder 129 is opposed to gear 125 as recess 124 nears that gear in the movement last described, it prevents any chance of gear 125 being over-driven in such a manner as to reach the other side of the recess and thus be maintained in mesh with gear 118, which might otherwise result in "over-clearing."

Figures 36, 37:
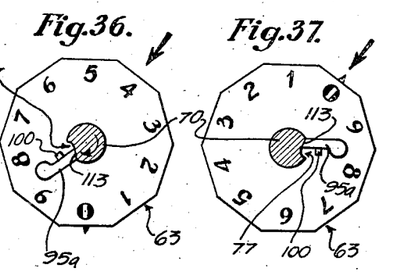

At the time gear 125 is slipped back into recess 124, shaft 70 will be in such a position that shoulder 113 will be in engagement with the pawls of all the counter wheels and will line them up accurately in zero position (Fig. 37). However, the instant gear 125 has been spring-urged out of mesh with gear 118, that gear 118 is freed for counterclockwise movement (as viewed in Fig. 8) under the impulse of spring 121 which thus causes lost motion between pin 119 and socket 120, restoring pin 119 to the position of Fig. 30 and moving shaft 70 in a counterclockwise direction sufficient to back shoulder 113 away from pawls 95 and 95a an appreciable extent (Fig. 34).

This back-off of the shoulder insures that during subsequent normal operation of the counter wheels, as any wheel reaches a position just short of zero, its pawl will drop ahead of the shoulder, so, in turn, when the counter is later cleared, it is assured that such a zero wheel will definitely be picked up ahead of all other wheels, to the end of preventing an incomplete clearing, such as described previously.

Thus, during rotation of shaft 130 to clear the counter, control disk 114 will be rotated exactly 360°, while gear 118 on shaft 70 will be rotated 360° plus, though shaft 70 is automatically rotated reversely by spring 122 an amount equal to this plus value when gears 118 and 125 are subsequently unmeshed. Since the plus value is the measure of the lost motion necessarily occuring before shoulder 113 reaches a position of engagement with the pawls of the first wheels to be picked up, no one of the wheels will be rotated more than 360° by the clearing operation.

It will be noted that the reset drive is automatically disconnected when the counter is cleared (by virtue of spring 131 returning gear 125 to a position occupying recess 124) and that all the operator has to do to complete fully the clearing operation is to press in knob 137, hold it pressed in while he rotates the knob slightly, and then relieve the inward pressure but continue to rotate the knob until spring 131 snaps gear 125 out of mesh with gear 118. If he continues rotation of the knob after the clearing operation, no harm is done, since gears 125 and 118 are then out of mesh and shaft 130 is in idle position.

It will be noted that control disk 114 has several functions. Among these, it acts with gears 125 and 118 to initially locate the reset shoulder 113 with respect to the pawls of the counter wheels and to establish the position to which that shoulder is advanced to clear the counter and positively line up all wheels in reset zero position. It also holds gears 125 and 118 in mesh against the tendency of spring 131 to throw them out of mesh. It also acts as a timing element in that it establishes the time at which gears 125 and 118 are allowed to be unmeshed by the action of spring 131. And its shoulder 129 prevents accidental "over-clearing."

I will now describe the means for resetting the accuracy wheel, this means being associated with the trip-counter clearing means so that actuation of knob 137 simultaneously clears both the trip counter and the accuracy wheel.

Sub-reset shaft 151 has bearing in end wall 26 and in extension 152 of bar 30 (Fig. 10), being capable of limited longitudinal movement through its bearings. At its outer end, shaft 151 carries a pinion 153, meshing with idler pinion 154 (Fig. 7) mounted for rotation on a stub shaft 155 extending from wall 26. Pinion 154 meshes with idler pinion 156 on stub shaft 157 and also meshes with gear 136 on sleeve 134, which sleeve, as previously noted, is keyed both to knob 137 and shaft 130.

The inner end of shaft 151 carries bevel pinion 158 (Figs. 9 and 10) which is lined up with bevel pinion 39 on shaft 32, though normally pinion 158 is held out of mesh with pinion 39 through the action of spring 131 on shaft 130, through the means to be described. A cross-head 160 has a bearing portion 161 taking shaft 130, said portion being held against movement longitudinally of the shaft due to its interposition between collar 162 pinned on that shaft and a fiber washer 163 on the shaft at the inner end of sleeve 134. Cross-head 160 has a bearing portion 164 taking shaft 151 and engaging a collar 165 pinned to shaft 151. Spring 166 on shaft 151 is interposed between portion 164 and a collar 167 pinned on the shaft, this spring tending to thrust the shaft to the left, as viewed in Fig. 9. The extent of this leftwise movement with respect to cross head 160 is limited by contact of collar 165 with cross head portion 164 which, when shaft 130 is held to the right by spring 131, holds gear 158 clear of pinion 39.

Figure 4:
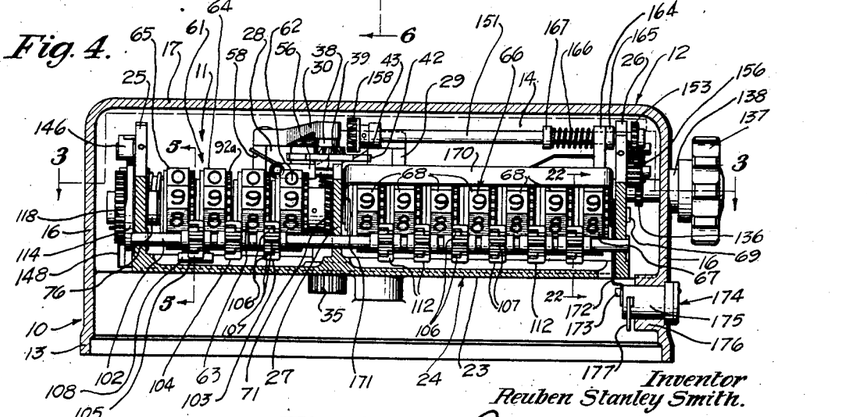
Fig. 4 is a section on line 4—4 of Fig. 3, but showing the shutter raised to operative position.

With the parts in the position of Figs. 3 and 4, it will be seen that rotation of knob 137 merely idly rotates gears 136, 156, 154, 153, 158, since the latter gear is held out of mesh with pinion 39. However, when knob 137 is pressed inwardly to move shaft 130 to the left, as viewed in Fig. 10, to bring about the previously described engagement of gears 118 and 125, cross-head 160 is likewise moved to the left, and through spring 166, moves shaft 151 in the same direction thus meshing bevel pinion 158 with bevel pinion 39, it being noted that the space between the side wall 26 and pinions 136 and 153 permits this left-wise movement of the two shafts, with the pinions still remaining in mesh with the wider-face idler pinions 154 and 156.

If, upon this left-wise movement of shaft 151, the teeth of pinions 39 and 158 are in position to ride one another instead of meshing, spring 166 will yield after the teeth come into such engagement and then, upon slight rotation being given to shaft 151 through knob rotation, as the teeth come into proper registration spring 166 will thrust shaft 151 to the left and cause full meshing of the bevel pinions.

Upon continued rotation of knob 137 in a direction proper to clear the trip counter wheels, as previously described, shaft 151 is rotated in a counterclockwise direction (Fig. 6) which, through bevel pinions 158 and 39, rotates accuracy wheel 42 in a counterclockwise direction, as viewed in Fig. 3. This rotation is continued until the zero indication on the accuracy wheel is in line with arrow 55, whereupon pawl 56 is spring-pressed into notch 59 (Fig. 29) to check further counterclockwise movement of this wheel. The gear ratio between pinion 136 and bevel pinion 39 is one to one, but the ratio of gears 125 and 118 is such that bevel gear 39 must be rotated more than one complete revolution before gear 125 has been rotated sufficiently to clear the trip counter, it thus being assured that the accuracy wheel is cleared before the trip counter is cleared and eliminating any chance of an incomplete accuracy wheel clearing.

After the accuracy wheel is stopped at zero position, the continued rotation of pinion 39 (which is brought about by the necessarily continued rotation of shaft 130, and hence of shaft 151, to clear the trip counter) is accommodated by the slip or friction drive mounting between the accuracy wheel and that bevel pinion, as has previously been described.

When shaft 130 is returned by spring 131 to the right, as occurs at the end of the trip counter clearing operation, cross-head 160 likewise returns shaft 151 to the right and disengages pinion 158 from pinion 39, thus restoring the entire mechanism to normal condition.

It has been found desirable to provide a shutter for concealing the totalizer wheels from unauthorized persons. For this purpose there is provided a shutter in the form of a blade 170 (Figs. 3, 4 and 7) extended across the face of the totalizer wheels and having in-turned ends 171 which have bearing on shaft 69. A link 172 extends from one end 171 to the usual eccentric pin 173 on the cylinder of lock 174. The barrel 175 of this lock is detachably held in housing boss 176 by detent 177. Through key control of the cylinder carrying eccentric pin 173, the latter may be rotated in a manner to throw the shutter to the raised position of Figs. 7 and 4 where it closes the sight opening 178 in face plate 52 (Fig. 11), in which position it may be locked, or may be rotated in a manner to pull link 172 downwardly (Fig. 3) and thus swing blade 170 clear of this sight opening to expose the number wheels of the totalizer through the opening and the corresponding portion of glass 20.

It will be understood various modifications and changes in design, structure and arrangement may be made without departing from the spirit and scope of the appended claims, the disclosed embodiment of the invention being illustrative of and not limitative on the invention.

I claim:

1. In a counter resetting mechanism, a counter shaft, a counter wheel on said shaft, means for rotating said shaft in a given direction, drive connective means between the shaft and wheel whereby shaft rotation rotates the wheel, said shaft rotating means embodying a first gear connected to said shaft, a second gear movable into and out of mesh with said first gear, means for rotating said second gear when it is meshed with the first gear, and means acting automatically upon the unmeshing of the gears to rotate said counter shaft in a reverse direction a limited amount without rotating said wheel.

2. In a counter resetting mechanism, a counter shaft, a counter wheel on said shaft, means for rotating said shaft, drive connective means between the shaft and wheel whereby shaft rotation in one direction rotates the wheel, means adapted to hold said shaft against other than slight rotation in the opposite direction, said shaft rotating means embodying a first gear connected to said shaft, a second gear movable into and out of mesh with said first gear, means for rotating said second gear when it is meshed with the first gear, means acting automatically to unmesh said gears after said first gear has been rotated in said one direction a predetermined amount, and means holding said gears in mesh until said first gear is rotated said predetermined amount.

3. In a counter resetting mechanism, a counter shaft, a counter wheel on said shaft, means for rotating said shaft in a given direction, drive connective means between the shaft and wheel whereby shaft rotation rotates the wheel, said shaft rotating means embodying a first gear connected to said shaft, a second gear movable into and out of mesh with said first gear, means for rotating said second gear when it is meshed with the first gear, means acting automatically to unmesh said gears after said first gear has been rotated a predetermined amount, and means acting automatically upon the unmeshing of the gears to rotate said counter shaft in a reverse direction a limited amount without rotating said wheel.

4. In a counter resetting mechanism, a counter shaft, a counter wheel on said shaft, means for rotating said shaft, drive connective means between the shaft and wheel whereby shaft rotation rotates the wheel, said shaft rotating means embodying a first gear connected to said shaft, a second shaft, a second gear on the second shaft, said second shaft being movable endwise to move the second gear into and out of mesh with the first gear, means for moving said second shaft endwise in said one direction, yieldable means tending to move said second shaft in the opposite direction to move said second gear out of mesh with the first gear, releasable means adapted to hold the second shaft against endwise movement in said opposite direction until the counter shaft has been rotated a predetermined extent, and means automatically releasing the holding means when the counter shaft has been rotated said predetermined extent.

5. In a counter resetting mechanism, a counter shaft, a counter wheel on said shaft, means for rotating said shaft, drive connection means between the shaft and wheel whereby shaft rotation rotates the wheel, said shaft rotating means embodying a first gear connected to the shaft, a second gear movable axially into and out of mesh with said first gear, means tending normally to hold said second gear out of mesh with the first gear, means for moving the second gear into mesh with the first gear, and a control member adapted to be driven by said first gear and cooperating with the second gear to hold it in mesh with the first gear until said first gear has been rotated a predetermined amount.

6. In a counter resetting mechanism, a counter shaft, a counter wheel on said shaft, means for rotating said shaft in a given direction, drive connection means between the shaft and wheel whereby shaft rotation rotates the wheel, said shaft rotating means embodying a first gear connected to the shaft, a second gear movable axially into and out of mesh with said first gear, means tending normally to hold said second gear out of mesh with the first gear, means for moving the second gear into mesh with the first gear, a control member adapted to be driven by said first gear and cooperating with the second gear to hold it in mesh with the first gear until said first gear has been rotated a predetermined amount, and means adapted to rotate said counter shaft in a reverse direction a limited amount when said second gear is initially unmeshed from the first gear, without reversely rotating said wheel.

7. In a counter resetting mechanism, a counter shaft, a counter wheel on said shaft, means for rotating said shaft in a given direction, drive connection means between the shaft and wheel whereby shaft rotation rotates the wheel, said shaft rotating means embodying a first gear connected to the shaft, a second gear movable axially into and out of mesh with said first gear, means tending normally to hold said second gear out of mesh with the first gear, means for moving the second gear into mesh with the first gear, a control member, a lost-motion drive connection between said second gear and the control member, and means adapted to rotate said counter shaft in a reverse direction a limited amount after said first gear has been successively meshed with the first gear, rotated, and unmeshed from the first gear, all without imparting reverse rotation to said wheel, said last mentioned means embodying a torsion spring applied to the second gear and control member and effective relatively to rotate them through an extent measured by the extent of lost motion allowed in said lost-motion drive connection.

8. In a counter resetting mechanism, a counter shaft, a counter wheel mounted for rotation on said shaft, a drive shoulder on said shaft, a drive shoulder on said wheel, said shaft shoulder being adapted to engage the wheel shoulder to drive the wheel when the shaft is rotated in a given direction, means for rotating said shaft in said direction a given extent, a releasable, positively acting lock automatically operable when the shaft has been rotated said extent and effective to prevent further shaft rotation in said one direction but permitting limited rotation of the shaft in a reverse direction, a spring acting to rotate said shaft in a reverse direction, after it has been rotated said given extent, to back the shaft shoulder away from the wheel shoulder, and means limiting the extent of such reverse rotation of the shaft.

9. In a counter having a pair of shafts with operatively connected counter wheels on one of the shafts and a fraction wheel on the other shaft, the counter wheels being selectively rotatable with or with respect to their shaft and the fraction wheel being selectively rotatable with or with respect to its shaft; resetting mechanism comprising means for rotating the fraction wheel with respect to its shaft, means interconnected with the first means for simultaneously rotating said one shaft, and resetting pawls carried by the counter wheels and adapted to impart rotative drive from the one shaft to the counter wheels.

10. In a counter having a pair of shafts with operatively connected counter wheels on one of the shafts and a fraction wheel on the other shaft, the counter wheels being selectively rotatable with or with respect to their shaft and the fraction wheel being selectively rotatable with or with respect to its shaft; resetting mechanism comprising means for rotating the fraction wheel with respect to its shaft, means interconnected with the first means for simultaneously rotating said one shaft, resetting pawls carried by the counter wheels and adapted to impart rotative drive from the one shaft to the counter wheels, a "zero" stop adapted to limit the extent of fraction wheel rotation, and a second "zero" stop adapted to limit the extent of rotation of said one shaft.

11. In a counter having a pair of shafts with operatively connected counter wheels on one of the shafts and a fraction wheel on the other shaft, the counter wheels being selectively rotatable with or with respect to their shaft and the fraction wheel being selectively rotatable with or with respect to its shaft; resetting mechanism comprising means for rotating the fraction wheel with respect to its shaft, means interconnected with the first means for simultaneously rotating said one shaft, resetting pawls carried by the counter wheels and adapted to impart rotative drive from the one shaft to the counter wheels, a "zero" stop adapted to limit the extent of fraction wheel rotation, and a second "zero" stop adapted to limit the extent of rotation of said one shaft, the angular velocity of the fraction wheel being greater than that of the counter wheels, and said first stop being adapted to become effective before the second stop becomes effective.

12. In a counter, a shaft, a counter wheel mounted for rotation on the shaft, a drive shoulder on the shaft, a drive shoulder on the wheel, said shaft shoulder being adapted to engage the wheel shoulder to drive the wheel toward zero position when the shaft is rotated in a given direction, and mechanism for rotating said shaft in said direction a given extent and then acting to rotate the shaft in a reverse direction to back the shaft shoulder away from the wheel shoulder, said mechanism embodying a control member on the shaft, a rotary, lost-motion drive-connection between the shaft and control member, a spring acting between the control member and shaft and tending to take up the lost motion of the drive connection by its tendency to rotate the shaft in said reverse direction and with relation to the control member, means for rotating the shaft in said given direction and thereby tending to take up the lost motion in the drive connection in a direction tending to tension the spring when the control member is retarded against movement in said given direction, continuing rotation of the shaft in said opposite direction engaging said shoulders, moving the counter wheel towards zero position and driving the control member in the same direction, and means positively checking rotation of the control member when it has rotated a predetermined extent and interrupting the drive to the shaft when the wheel reaches zero position, said spring being thereafter effective to rotate the shaft reversely a limited extent.

13. In a counter, a shaft, a counter wheel mounted for rotation on the shaft, a drive shoulder on the shaft, a drive shoulder on the wheel, said shaft shoulder being adapted to engage the wheel shoulder to drive the wheel toward zero position when the shaft is rotated in a given direction, and mechanism for rotating said shaft in said direction a given extent and then acting to rotate the shaft in a reverse direction to back the shaft shoulder away from the wheel shoulder, said mechanism embodying a control member on the shaft, a rotary, lost-motion drive-connection between the shaft and control member, a friction brake acting on the control member, a spring acting between the control member and shaft and tending to take up the lost motion of the drive connection by its tendency to rotate the shaft in said reverse direction and with relation to the control member, means for rotating the shaft in said given direction and thereby first taking up the lost motion in the drive connection in a direction tending to tension the spring, continuing rotation of the shaft in said opposite direction engaging said shoulders, moving the counter wheel towards zero position and positively driving the control member in the same direction, and means positively and simultaneously checking rotation of the control member and interrupting the drive to the shaft when the wheel reaches zero position, said spring being thereafter effective to rotate the shaft reversely a limited extent.

14. In a counter having a pair of shafts with operatively connected counter wheels on one of the shafts and a fraction wheel on the other shaft, the counter wheels being selectively rotatable with or with respect to their shaft and the fraction wheel being selectively rotatable with or with respect to its shaft; resetting mechanism comprising means for rotating the fraction wheel with respect to its shaft, resetting pawls carried by the counter wheels and adapted to impart rotative drive from the one shaft to the counter wheels, a pair of gears, one on each shaft, a pair of axially movable shafts, a pair of gears mounted, one each, on said axially movable shafts, said second pair of gears being movable into and out of mesh, one with each of the first pair of gears, by virtue of axial movement of said axially movable shafts, means interconnecting said axially movable shafts for coincident rotation, and means interconnecting said axially movable shafts for coincident axial movement in a direction to mesh said gears.

15. In a counter having a pair of shafts with operatively connected counter wheels on one of the shafts and a fraction wheel on the other shaft, the counter wheels being selectively rotatable with or with respect to their shaft and the fraction wheel being selectively rotatable with or with respect to its shaft; resetting mechanism comprising means for rotating the fraction wheel with respect to its shaft, resetting pawls carried by the counter wheels and adapted to impart rotative drive from the one shaft to the counter wheels, a pair of gears, one on each shaft, a pair of axially movable shafts, a pair of gears mounted, one each, on said axially movable shafts, said second pair of gears being movable into and out of mesh, one with each of the first pair of gears, by virtue of axial movement of said axially movable shafts, means interconnecting said axially movable shafts for coincident rotation, and yieldable means interconnecting said axially movable shafts for coincident axial movement in a direction to mesh said gears.

16. In a counter having a pair of shafts with operatively connected counter wheels on one of the shafts and a fraction wheel on the other shaft, the counter wheels being selectively rotatable with or with respect to their shaft and the fraction wheel being selectively rotatable with or with respect to its shaft; resetting mechanism comprising means for rotating the fraction wheel with respect to its shaft, resetting pawls carried by the counter wheels and adapted to impart rotative drive from the one shaft to the counter wheels, a pair of gears, one on each shaft, a pair of axially movable shafts, a pair of gears mounted, one each, on said axially movable shafts, said second pair of gears being movable into and out of mesh, one with each of the first pair of gears, by virtue of axial movement of said axially movable shafts, means interconnecting said axially movable shafts for coincident rotation, and means interconnecting said axially movable shafts for coincident axial movement in both directions.

17. In a counter having a pair of shafts with operatively connected counter wheels on one of the shafts and a fraction wheel on the other shaft, the counter wheels being selectively rotatable with or with respect to their shaft and the fraction wheel being selectively rotatable with or with respect to its shaft; resetting mechanism comprising means for rotating the fraction wheel with respect to its shaft, resetting pawls carried by the counter wheels and adapted to impart rotative drive from the one shaft to the counter wheels, a pair of gears, one on each shaft, a pair of axially movable shafts, a pair of gears mounted, one each, on said axially movable shafts, said second pair of gears being movable into and out of mesh, one with each of the first pair of gears, by virtue of axial movement of said axially movable shafts, means interconnecting said axially movable shafts for coincident rotation, means interconnecting said axially movable shafts for coincident axial movement in both directions, yieldable means tending to move said axially movable shafts in a direction to unmesh said gears, and means acting to hold said axially movable shafts against movement under the action of said yieldable moving means after the gears have been meshed and until said one of the shafts has been rotated through a predetermined extent.

REUBEN STANLEY SMITH.